United States Patent Office 3,301,548
Patented Jan. 31, 1967

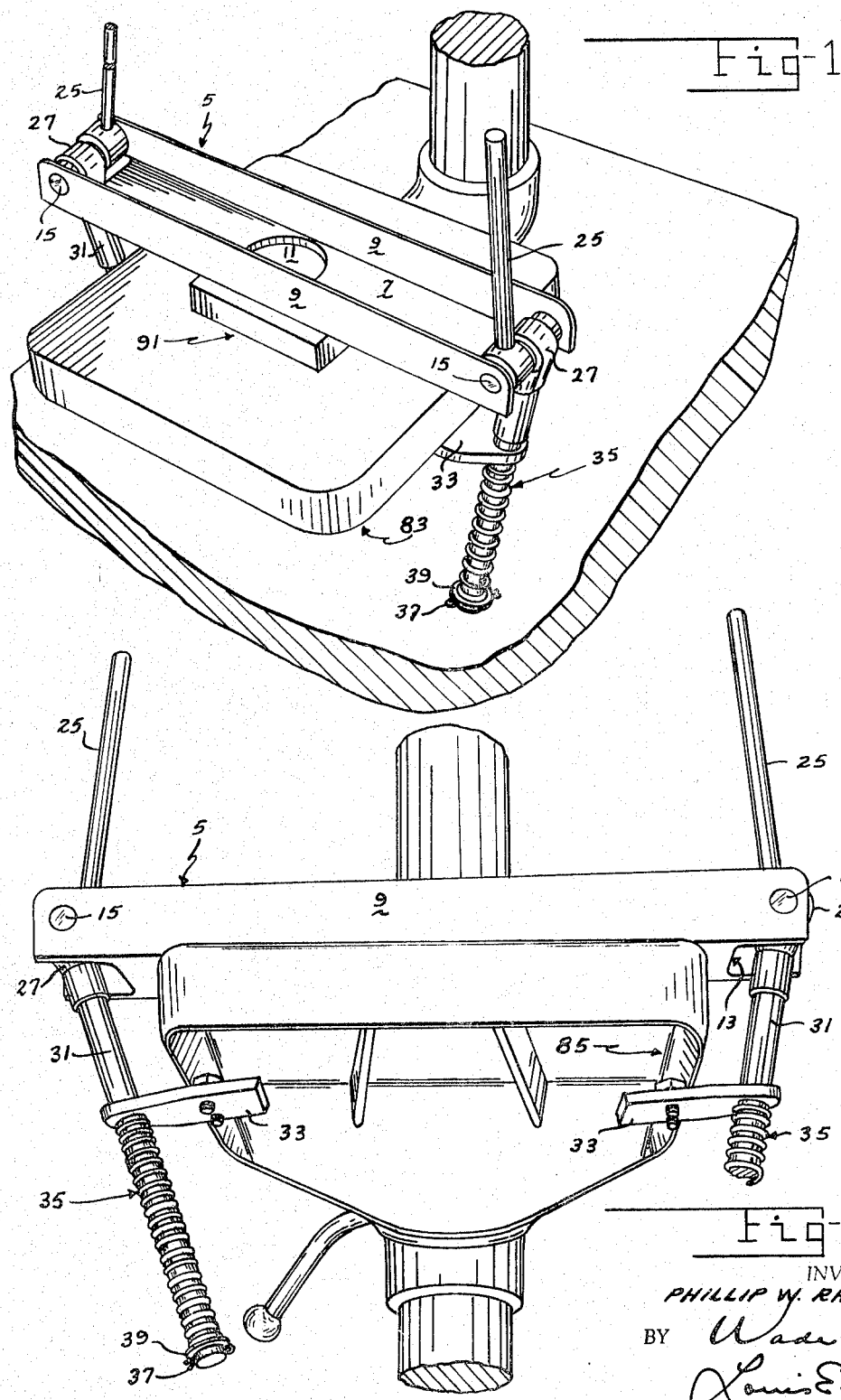

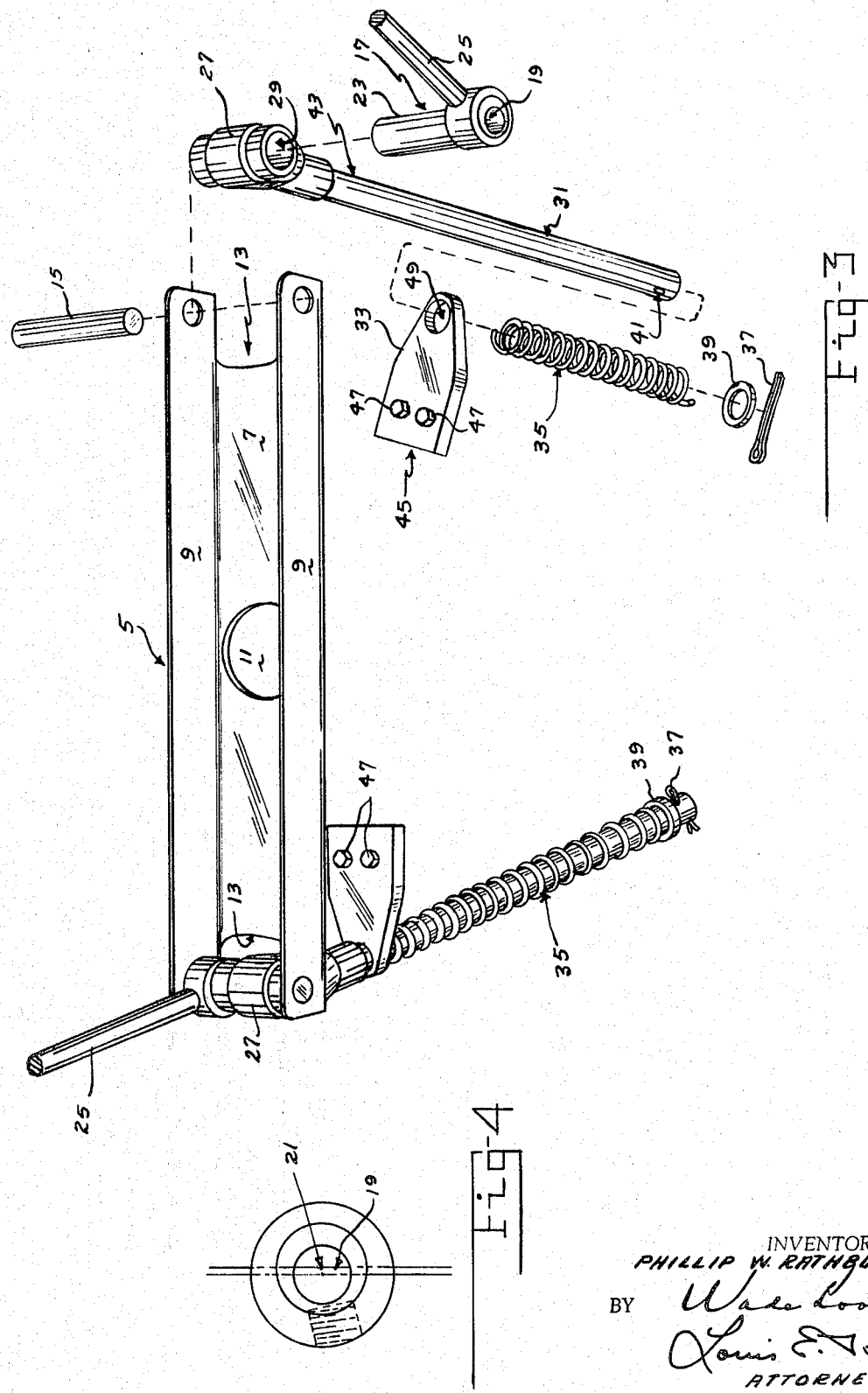

3,301,548
WORK PIECE HOLDER
Phillip W. Rathbun, 16851 Bellaire Ave.,
Edwards, Calif. 93523
Filed Aug. 13, 1964, Ser. No. 389,506
7 Claims. (Cl. 269—92)

The invention described herein may be manufactured and used by or for the United States Government for governmental purposes without payment to me of any royalty thereon.

The instant invention relates to a device of the type used to securely position a work piece onto a work platform.

The means now in use to secure a work piece to a work platform are C clamps which are inconvenient and time consuming and in some cases impossible to use. Other means presently in use to secure a work piece to a work platform are bolts and nuts used in T slots in the work platform which constitutes a number of blocks, slotted bars, etc., and which take time to assemble.

The present invention overcomes these and other difficulties in that it is contained in one assembly. The present invention needs no extra blocks or other accessories and adjusts automatically. The work piece can be secured in seconds.

It is an object of the instant invention to provide a device for holding a work piece on a work platform that is self-contained and self-adjusting to any thickness of the work piece.

A further object of the invention is to provide a quick and convenient means to hold a work piece securely on the work platform of a drill press or like machine.

Yet another object of the instant invention is to provide a device for holding a work piece on a work platform which can be quickly and easily engaged in the operative position and disengaged by the operator.

A still further object of the instant invention is to provide a device for holding a work piece on a work platform whose simplicity of operation and convenience would induce operators to use the device instead of trying to hold the work piece by hand, thus improving safety conditions.

Other objects of the invention are to provide a device for holding a work piece on a work platform of the type described which is simple in construction, strong, durable, efficient and reliable in use, compact, and which may be manufactured easily and inexpensively.

The foregoing and further objects of the invention will become apparent from a study of the following specification, taken in connection with the accompanying drawings wherein like characters of reference designate corresponding parts throughout the several views.

FIG. 1 is a view in perspective looking down at an embodiment of the invention in locking engagement with the work platform.

FIG. 2 is a view in perspective looking up at the same embodiment of the invention in locking engagement with the work platform.

FIG. 3 is a view in perspective of the same embodiment of the invention removed from the work platform and with the right end portion of the device exploded and like elements of the invention on the left end of the figure in assembled position.

FIG. 4 is an end view of one of the eccentric axes and the cam apparatus that is a part of the cam locking means.

Referring now more particularly to the drawings, and to the characters of reference marked thereon, the device comprises an elongated base member 5 that is U-shaped in cross section and has sufficient length to extend beyond the sides of the work platform when in the engaged position. The base member 5 is comprised of two parallel disposed side elements 9 mounted at right angles to a center element 7; said center element having an aperture 11 in the center thereof to allow for the passage of a work tool or the like which is not shown. The center element 7 also has a cutaway portion 13 on each end thereof to allow the parallel elements 9 to extend beyond the ends of the center element 7. A pin 15 is mounted at each end of the base member 5 to extend at right angles through the side elements 9. Rotatably mounted on each pin 15, between the side elements 9, is a sleeve 17 having a longitudinal bore 19, eccentric with the axis 21 of the sleeve 17 to provide a cam surface 23 in relation to the longitudinal bore 19. An actuating lever 25 is joined to the sleeve 17 for rotating the sleeves 17 on the pins 15. Eye members 27 are mounted for rotation on the sleeves 17. The internal surface of the bore in the eye member 27 provides a cam follower 29 for the cam surface 23 of the sleeves 17. An end 43 of the shaft member 31 is joined to the eye member 27.

A cantilevered gripping plate 33 is slidably mounted on the shaft member 31 adjacent the eye member 27. A coil compression spring 35 is coiled around the shaft member 31 beneath the cantilevered gripping plate 33. A flat washer 39 is mounted on the shaft member 31 below the coil compression spring 35. Near the end 41 of the shaft member 31, opposite the end 43, joined to the eye member 27, is positioned a cotter key 37. The cotter key 37 is mounted in the usual manner and acts as a stop for the flat washer 39.

The coil compression spring 35 therefore biases the cantilevered gripping plate 33 toward the cam end 43 of the shaft member 31.

Adjacent the free end 45 of the cantilevered gripping plate 33 two screws 47 are mounted to form stops to laterally locate the device by nesting within the stiffening flange 85 surrounding the work platform 83.

To operate the work holding device, the base member 5, with the cams in the unlocked position, is placed on top of the work piece 91 to be held in place on the work platform 83 and the cantilevered gripping plates 33 are pressed down, compressing the coil compression springs 35 to a point where the cantilevered gripping plates 33 will hook under the side stiffening flanges 85 of the work platform 83 as shown in FIG. 2.

The device is cammed to the locked position by rotating the cam actuating levers 25 up, thus rotating the cam surface 23 of the sleeves 17. The resulting cam action between the cam surface 23 and the cam follower 29 pulls the shaft member 31 toward the base member 5.

The force applied by the cam action is off center of the hole 49 of the cantilevered gripping plate 33 slidably mounted on the shaft member 31; therefore, the cantilevered gripping plates 33 are locked by friction and will not slip. The base member 5 is thereby pulled toward the work platform 83 thus securely holding the work piece 91 in position on the work platform 83.

The cantilevered gripping plates 33 which are slidably mounted on the shaft member 31 will bind at any point on the shaft member 31, therefore, the device will adjust automatically to any thickness of the work piece 91 to be held in place on the work platform 83.

The device is now in the locked or engaged position as shown in FIGS. 1 and 2.

To release, the device is cammed to the unlocked position by rotating the cam actuating levers 25 down. The device is removed by compressing the coil compression spring 35 sufficiently to permit removing the device from the work platform 83.

While this specification sets forth in detail the present and the preferred embodiment of the invention, variations and departures may be made from said preferred embodiment by those skilled in the art without deviating from the spirit and scope of the invention as defined in the appended claims.

Having thus particularly described the invention, it is desired to secure Letters Patent of the United States on the following claims.

I claim:
1. A device for holding a work piece on a work platform comprising: first means adapted to releasably secure the work piece to the work platform; members pivotally mounted at each end to the first means about eccentric axes and adapted to releasably secure the first means to the work paltform; locking means associated with the members and their respective eccentric axes to pivot the members in an arcuate path into locking engagement with the work platform.

2. A device for holding a work piece on a work platform comprising: first means adapted to releasably secure the work piece to the work platform; members pivotally mounted at each end to the first means about eccentric axes and adapted to releasably secure the first means to the work platform; cam locking means associated with the members and their respective eccentric axes to pivot the members in an arcuate path into locking engagement with the work platform.

3. A device for holding a work piece on a work platform comprising: first means adapted to releasably secure the work piece to the work platform; members pivotally mounted at each end to the first means about eccentric axes and adapted to releasably secure the first means to the work platform; cam locking means having actuating means, the cam locking means associated with the members and their respective eccentric axes to pivot the members in an arcuate path into locking engagement with the work platform.

4. A device for holding a work piece on a work platform comprising: first means having a bearing surface adapted to releasably secure the work piece to the work platform; pins mounted on each end of the first means, cam means including cam actuating means mounted for rotation on the pins; cam follower means operatively connected to the cam means; shaft means connected to the cam follower means; cantilevered gripping means slidably mounted on the shaft means; means for biasing the gripping means toward the first means whereby rotation of the cam by the cam actuating means moves the cam follower means, the shaft means, and the gripping means in an arcuate path toward the first means bringing the gripping means into locking engagement with the work platform.

5. A device for holding a work piece on a work platform comprising: elongated first means having a bearing surface adapted to releasably secure the work piece to the work platform; pins mounted on each end of the first means; cam means including cam actuating means mounted for rotation on the pins; cam follower means operatively connected to the cam means; shaft means connected to the cam follower means; cantilevered gripping means slidably mounted on the shaft means; means for biasing the gripping means toward the first means, whereby rotation of the cam by the cam actuating means moves the cam follower means, the shaft means, and the gripping means in an arcuate path toward the first means bringing the gripping means into locking engagement with the work platform.

6. A device for holding a work piece on a work platform comprising: elongated first means having a bearing surface adapted to releasably secure the work piece to the work platform, the first means having sufficient length to extend beyond the sides of the work platform when in the engaged position; pins mounted on each end of the first means; cam means including cam actuating means mounted for rotation on the pins; cam follower means operatively connected to the cam means; shaft means connected to the cam follower means; cantilevered gripping means slidably mounted on the shaft means; means for biasing the gripping means toward the first means, whereby rotation of the cam by the cam actuating means moves the cam follower means, the shaft means, and the gripping means in an arcuate path toward the first means bringing the gripping means into locking engagement with the work platform.

7. A device for holding a work piece on a work platform comprising: elongated first means having a bearing surface adapted to releasably secure the work piece to the work platform, the first means having sufficient length to extend beyond the sides of the work platform when in the engaged position; pins mounted on each end of the first means; sleeves each having a longitudinal bore eccentric with the axis of the sleeve to provide a cam in relation to the longitudinal bore, the sleeves mounted for rotation on the pins; actuating means joined to the sleeves for rotating the sleeves on the pins; eye members mounted for rotation on the sleeves to provide a cam follower means; shaft means connected to the eye members; cantilevered gripping means slidably mounted on the shaft means; means for biasing the gripping means toward the first means whereby rotation of the sleeves on the pins by the actuating means results in a cam action between the sleeves and the eye members thereby moving the eye members, the shaft means, and the gripping means in an arcuate path toward the first means bringing the gripping means into locking engagement with the work platform.

References Cited by the Examiner

UNITED STATES PATENTS 2,581,040   1/1952   Mullenbach _____ 269—235 X

FOREIGN PATENTS 1,038,248   9/1958   Germany.

ROBERT C. RIORDON, *Primary Examiner.*

A. T. McKEOWN, *Assistant Examiner.*